(12) United States Patent
Kim et al.

(10) Patent No.: US 12,480,556 B2
(45) Date of Patent: Nov. 25, 2025

(54) COMPOSITE MATERIAL CAPABLE OF MEASURING BENDING DEFORMATION, SPRING INCLUDING THE SAME, AND MANUFACTURING METHOD THEREOF

(71) Applicant: KOREA ADVANCED INSTITUTE OF SCIENCE AND TECHNOLOGY, Daejeon (KR)

(72) Inventors: Seong Su Kim, Daejeon (KR); Hyunsoo Hong, Daejeon (KR); Muhammad Salman Sarfraz, Daejeon (KR); Seung Yoon On, Daejeon (KR); Jaemoon Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 457 days.

(21) Appl. No.: 17/562,667

(22) Filed: Dec. 27, 2021

(65) Prior Publication Data

US 2022/0333659 A1  Oct. 20, 2022

(30) Foreign Application Priority Data

Apr. 15, 2021 (KR) .................. 10-2021-0048882
Nov. 26, 2021 (KR) .................. 10-2021-0165213

(51) Int. Cl.
*G01N 27/22* (2006.01)
*B29C 65/00* (2006.01)
(Continued)

(52) U.S. Cl.
CPC .......... *F16F 1/368* (2013.01); *B29C 66/7212* (2013.01); *B29C 66/727* (2013.01);
(Continued)

(58) Field of Classification Search
CPC .............. F16F 1/368; F16F 2224/0225; F16F 2224/0241; F16F 2226/042;
(Continued)

(56) References Cited

U.S. PATENT DOCUMENTS 4,586,109 A * 4/1986 Peters ................. G01L 9/0073
361/283.4
5,604,314 A * 2/1997 Grahn ................. G01L 1/255
73/862.541
(Continued)

FOREIGN PATENT DOCUMENTS

KR  10-2009-0109854  10/2009
KR  10-2017-0106526  9/2017
(Continued)

*Primary Examiner* — Christopher P Schwartz

(57) ABSTRACT

Provided is a composite material capable of measuring bending deformation, the composite material including: a first conductive composite body that is bendable; a dielectric body that is bendable and compressible; and a second conductive composite body that is bendable, wherein the first conductive composite body and the second conductive composite body are respectively stacked on both surfaces of the dielectric body, and heights of the first conductive composite body and the second conductive composite body from the dielectric body are different from each other.

14 Claims, 4 Drawing Sheets

(51) Int. Cl.
*B29C 70/30* (2006.01)
*F16F 1/368* (2006.01)
*G01B 7/16* (2006.01)
*B29K 63/00* (2006.01)
*B29K 307/04* (2006.01)
*B29L 31/00* (2006.01)

(52) U.S. Cl.
CPC ............... *B29C 70/30* (2013.01); *G01B 7/22* (2013.01); *B29K 2063/00* (2013.01); *B29K 2307/04* (2013.01); *B29L 2031/752* (2013.01); *B29L 2031/774* (2013.01); *F16F 2224/0225* (2013.01); *F16F 2224/0241* (2013.01); *F16F 2226/042* (2013.01); *F16F 2230/0047* (2013.01)

(58) Field of Classification Search
CPC ........... F16F 2230/0047; B29C 66/727; B29C 66/7212; B29C 70/30; B29K 2063/00; B29K 2307/04; B29L 2031/752; B29L 2031/04; B29L 2031/774

USPC .................................. 267/148, 149, 158, 160
See application file for complete search history.

(56) References Cited

U.S. PATENT DOCUMENTS

| | | | | |
|---|---|---|---|---|
| 7,208,960 | B1 * | 4/2007 | Deangelis | G01L 1/146 324/661 |
| 7,719,007 | B2 * | 5/2010 | Tompkins | G01L 1/142 438/18 |
| 10,078,027 | B2 * | 9/2018 | Masuda | G01L 9/0073 |
| 2015/0168330 | A1 * | 6/2015 | Gryska | G01N 33/0062 427/79 |
| 2016/0202800 | A1 * | 7/2016 | Itaya | G06F 3/0447 345/174 |
| 2018/0238716 | A1 | 8/2018 | Madden et al. | |

FOREIGN PATENT DOCUMENTS

KR 20170108899 A * 9/2017 ............... H02N 2/18
KR 10-2013-0033559 4/2021

* cited by examiner

COMPOSITE MATERIAL CAPABLE OF MEASURING BENDING DEFORMATION, SPRING INCLUDING THE SAME, AND MANUFACTURING METHOD THEREOF

CROSS-REFERENCE TO RELATED APPLICATION

This application claims priority of Korean Patent Application No. 10-2021-0048882, filed on Apr. 15, 2021, and priority of Korean Patent Application No. 10-2021-0165213, filed on Nov. 26, 2021, in the KIPO (Korean Intellectual Property Office), the disclosure of which is incorporated herein entirely by reference.

BACKGROUND OF THE INVENTION

Field of the Invention

The present disclosure relates to a composite material capable of measuring bending deformation, a spring including the same, and a manufacturing method thereof, and more particularly, to a composite material capable of measuring bending deformation without adding a separate sensor in the composite material used in a deformed component such as a spring to reduce a weight and store and release elastic energy produced according to bending, a spring including the composite material, and a method of manufacturing the composite material.

Description of the Related Art

A composite has excellent mechanical properties including specific strength and specific stiffness and has a high elastic energy storage rate, and thus is used for various types of springs such as a coil spring, a leaf spring, and a wave spring.

In particular, when a composite spring is applied to a mobile robot, a weight may be reduced and elastic energy may be stored and released, thereby further improving navigation performance. Also, navigation data such as a ground reaction force, and ankle, knee, or hip joint angles may be derived from dynamic deformation of the composite spring according to navigation of the mobile robot. When a motor is controlled in real time according to the navigation data, the navigation performance of the mobile robot may be further maximized.

In order to detect dynamic deformation of the composite spring, an additional sensor is generally required, and an externally attached sensor or a sensor embedded in a composite is mainly used. Among them, because the externally attached sensor itself is directly exposed to an external environment, the externally attached sensor is very vulnerable in terms of durability when the externally attached sensor undergoes rapid dynamic deformation like the mobile robot. Examples of the sensor embedded in the composite may include a piezoelectric ceramic sensor and an optical fiber bragg grating (FBG) sensor.

However, because such sensors are more brittle than composites, the sensors easily break in structures with large deformation such as springs. Also, because sensors embedded in composites have greater diameters and lower mechanical properties than reinforcement fiber, stress concentration easily occurs and the mechanical properties of structures are degraded. Also, both a method of using an externally attached sensor and a method of using an embedded sensor have disadvantages in that additional sensor installation is required.

Accordingly, it is necessary to develop a composite material capable of detecting bending deformation through a capacitance change without an additional sensor while storing and releasing elastic energy for improving the navigation performance of a robot, and a spring using the composite material.

SUMMARY OF THE INVENTION

The present disclosure is directed to providing a composite material capable of detecting bending deformation and being applicable to a spring or the like, and a method of manufacturing the composite material.

In one aspect, there is provided a composite material capable of measuring bending deformation, the composite material including: a first conductive composite body that is bendable; a dielectric body that is bendable and compressible; and a second conductive composite body that is bendable, wherein the first conductive composite body and the second conductive composite body are respectively stacked on both surfaces of the dielectric body, wherein heights of the first conductive composite body and the second conductive composite body from the dielectric body are different from each other.

Deformation of the dielectric body in a thickness direction may be dominant according to bending deformation of the composite material.

A height ratio between the first conductive composite body and the second conductive composite body may be determined so that the dielectric body is closer to the first conductive composite body than the second conductive composite body.

The first conductive composite body and the second conductive composite body may be carbon fiber reinforced plastics. Based on curvature, the first conductive composite body may be provided in an inner diameter direction and the second conductive composite body may be provided in an outer diameter direction, and the second conductive composite body may be thinner than the first conductive composite body.

The dielectric body may be a compressible foam. The dielectric foam may be a foam including at least one selected from the group consisting of polyvinyl chloride (PVC), polyurethane (PU), melamine, polymethacrylimide (PMI), polyethylene terephthalate (PET), and polyvinylidene fluoride (PVDF).

The first and second conductive composite bodies may be conductive carbon fiber reinforced plastics. The first and second conductive composite bodies may include at least one selected from the group consisting of a uni-directional carbon fiber composite, a carbon fabric composite, and a short carbon fiber composite.

The dielectric body may have a lower density than the first conductive composite body and the second conductive composite body.

In another aspect, there is provided a spring including the composite material. The composite material of the spring may be configured to store elastic energy produced when the spring is compressed in the dielectric body and then release the elastic energy upon recovery.

In another aspect, there is provided a method of manufacturing the composite material, the method including: obtaining first and second conductive composite bodies by molding carbon fiber reinforced plastics having different thicknesses into bent shapes; and respectively adhering the first and second conductive composite bodies to both surfaces of the dielectric body, wherein the dielectric body is a compressible foam. The carbon fiber reinforced plastics may be manufactured by stacking a plurality of carbon fibers and then impregnating epoxy.

A composite material according to the present disclosure has a structure including a dielectric body asymmetrically located between composites constituting the composite material, and, when a spring of a composite according to the present disclosure is used, bending deformation may be detected through a capacitance change of a structure itself without an externally attached sensor or an embedded sensor. Also, when a sandwich composite spring is manufactured by using a foam as a core, a weight may be reduced and spring stiffness may be secured.

Furthermore, when a composite material according to the present disclosure is used as an ankle spring of a mobile robot, the composite material may store and release elastic energy produced by bending to improve the navigation performance of the robot, and may obtain in real time navigation data such as a ground reaction force and ankle, knee, and hip join angles from a capacitance change of a structure.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
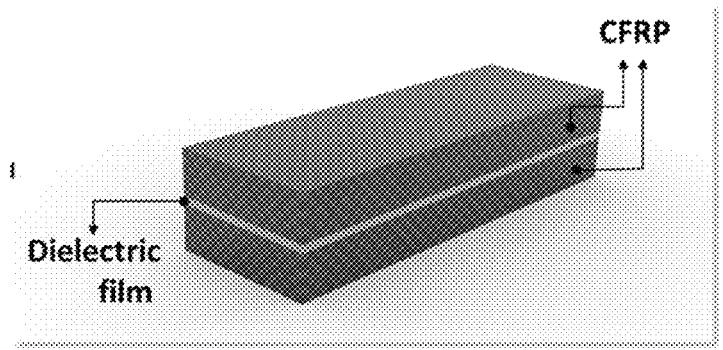
FIG. 1 is a schematic view illustrating a conventional structural capacitor using composites.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

To solve the problems, the present disclosure provides an integrated sandwich composite material including a dielectric body that is asymmetrically located, and a spring using the integrated sandwich composite material. Although a weight of a composite material is reduced by using a foam core as the dielectric body in an embodiment of the present disclosure, the scope of the present disclosure is not limited to a specific type of dielectric body described below.

A composite material according to the present disclosure uses capacitance to measure bending deformation, and the capacitance is defined by a thickness, a width, and a dielectric constant of a dielectric body located between two electrodes.

Figure 2:
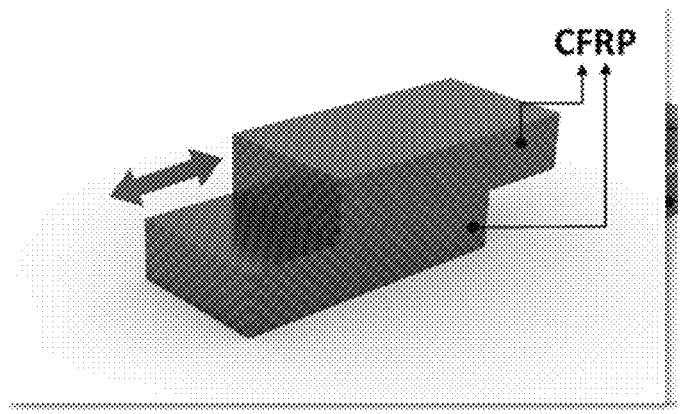
FIG. 2 is a schematic view illustrating a method of detecting capacitance by using the separated composites of FIG. 1 as electrodes.

FIG. 1 is a schematic view illustrating a conventional structural capacitor using composites. FIG. 2 is a schematic view illustrating a method of detecting capacitance by using the separated composites of FIG. 1 as electrodes.

Referring to FIG. 1, the prior arts related to a method of using a structural capacitor through a film functioning as a dielectric body and plate-shaped carbon fiber reinforced plastics (CFRP) functioning as electrodes.

In this case, composites were mainly used to secure structural safety by increasing the mechanical properties of the capacitor rather than detecting deformation. Also, this structure has a problem in that a sensitivity to a capacitance change is very low because deformation of the dielectric body in a thickness direction due to structural deformation is very small.

Referring to FIG. 2, according to the prior art, separated conductive composites are used as electrodes, an overlapping area varies according to relative positions of the two composite electrodes, and thus changed capacitance is detected.

However, in the prior art, a degree of capacitance change is low because there is no dielectric body between the electrodes, and there is a limitation in measuring deformation of a structure itself because the composites are separated from each other.

In order to solve the problems, the present disclosure provides a sandwich composite material including a dielectric body asymmetrically inserted between composites, to perform sensing through the composite material itself, reduce a weight, and release elastic energy.

Figure 3:
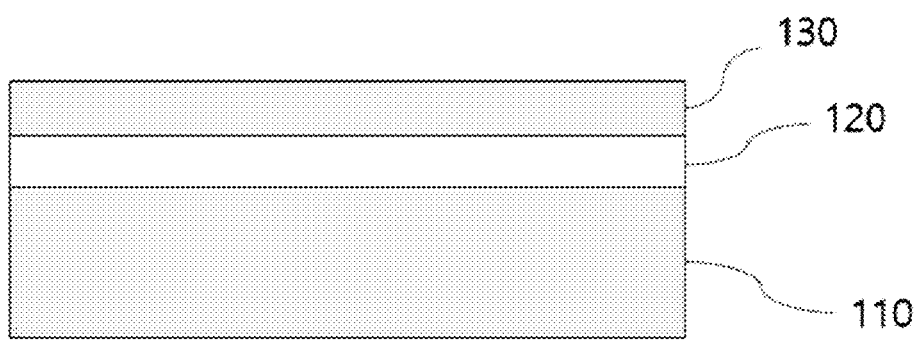
FIG. 3 is a cross-sectional view illustrating a composite material, according to an embodiment of the present disclosure.

FIG. 3 is a cross-sectional view illustrating a composite material, according to an embodiment of the present disclosure.

Referring to FIG. 3, a composite material capable of measuring bending deformation according to an embodiment of the present disclosure includes: a first conductive composite body 110 that is bendable; a dielectric body 120 that is bendable and compressible; and a second conductive composite body 130 that is bendable, wherein the first conductive composite body 110 and the second conductive composite body 130 are respectively stacked on both surfaces of the dielectric body 120.

In an embodiment of the present disclosure, heights of the first conductive composite body and the second conductive composite body are different from each other, and a height ratio is determined so that the dielectric body is closer to the first conductive composite body than the second conductive composite body, and thus the dielectric body is symmetrical in one direction.

In this case, a height d1 of the first conductive composite body 110 from the dielectric body 120 is different from a height d2 of the second conductive composite body 130 from the dielectric body 120. According to the present disclosure, the dielectric body is asymmetrically located in an outer diameter direction of curvature based on a mid-plane of the composite material, to enable compressive deformation to occur dominantly and increase a degree of capacitance change. The term "dominant" means that deformation in a height direction is greater than deformation in length or other directions.

In an embodiment of the present disclosure, the first conductive composite body and the second conductive composite body are carbon fiber reinforced plastics (CFRP), and the dielectric body is a compressible foam.

In an embodiment of the present disclosure, the first and second conductive composite bodies may be conductive carbon fiber reinforced plastics. In this case, at least one selected from the group consisting of a uni-directional carbon fiber composite, a carbon fabric composite, and a short carbon fiber composite may be used as a conductive composite body material.

Also, a foam core that is the dielectric body may include at least one selected from the group consisting of polyvinyl chloride (PVC), polyurethane (PU), melamine, polymethacrylimide (PMI), polyethylene terephthalate (PET), and polyvinylidene fluoride (PVDF), and, in particular, the foam core may have a lower density than the conductive composite body, thereby making it possible to store and release spring elastic energy.

Figure 4:
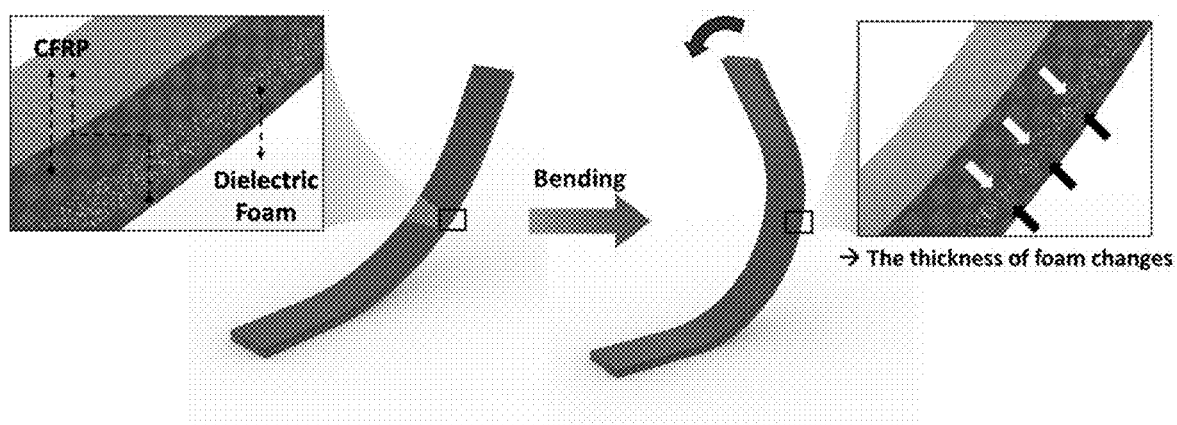
FIG. 4 is a schematic view illustrating a structure of a sandwich composite spring including an asymmetric dielectric foam core, according to the present disclosure.

FIG. 4 is a schematic view illustrating a structure of a sandwich composite spring including an asymmetric dielectric foam core, according to the present disclosure.

Referring to FIG. 4, composite material conductive composite bodies that are conductive carbon fiber reinforced plastics functioning as conductive composite bodies are manufactured by hand laying up a carbon fiber on a mold with a certain curvature shape to have a leaf spring shape and impregnating epoxy, or directly hand laying up a prepreg in which epoxy is pre-impregnated, and then performing hot press molding or autoclave molding.

In this case, the two carbon fiber reinforced plastics are manufactured to have different thicknesses in order to make a sandwich composite material including a core asymmetrically staked based on a mid-plane. In the specification, the term "asymmetric" means that a dielectric core is inclined in one direction from the center of the entire composite material.

Next, a foam core composite sandwich composite material is manufactured by locating a foam core with dielectric properties between the two fiber reinforced plastics and then performing adhesion under certain curing conditions.

In an embodiment of the present disclosure, the adhesion may be performed by using methods such as adhesive application, use of an adhesive film, and co-curing. In this case, as described above, a relatively thick carbon fiber reinforced plastic is located in an inner diameter direction based on curvature, and a relatively thin carbon fiber reinforced plastic is located in an outer diameter direction.

The composite material of the present disclosure manufactured by using the method has a foam core sandwich structure, and stores and releases elastic energy during bending deformation. Also, in this case, the foam core is deformed in a thickness direction due to the overall bending deformation, resulting in a capacitance change.

The composite material according to the present disclosure may be able to detect bending deformation of a composite spring through a structural shape without an additional sensor, may reduce a weight of the entire structure by using the foam core, and may increase a degree of capacitance change by further maximizing deformation of the dielectric body in the thickness direction due to bending deformation through a mechanical property difference from the carbon fiber reinforced plastics.

Also, because compressive deformation in the thickness direction is dominantly caused by asymmetrically stacking the foam core in an outer diameter direction based on a mid-plane, a capacitance change may be increased and tensile deformation on an adhesive interface vulnerable to tension may be minimized. Also, because most of stress caused by bending deformation is applied to a face sheet, rather than the core, a bending stiffness change of the structure itself due to the foam core is insignificant. Accordingly, mechanical property degradation of a material due to stiffness degradation may be minimized, and the mechanical stiffness of the material may be increased.

Figure 5:
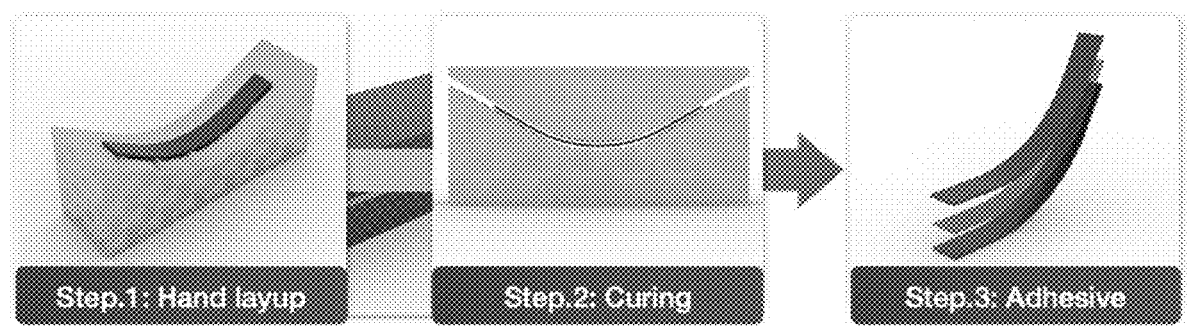
FIG. 5 is a view for describing a method of preparing a bent conductive composite body, according to an embodiment of the present disclosure.

The composite material according to the present disclosure is manufactured: by manufacturing two composite bodies having different thicknesses; and adhering the two composite bodies on both surfaces of a foam core. FIG. 5 is a view for describing a method of manufacturing a bent conductive composite body, according to an embodiment of the present disclosure.

Referring to FIG. 5, steps for manufacturing a sensor integrated foam core sandwich composite spring capable of measuring bending deformation are as follows.

First, two carbon fiber reinforced plastic prepregs are hand laid up on a metal mold in a leaf spring shape to have different thicknesses, or carbon fiber is hand laid up, and then epoxy is impregnated.

Next, molding is performed under certain curing conditions through hot press or autoclave, a thick carbon fiber reinforced plastic is located in an inner diameter direction and a thin carbon fiber reinforced plastic is located in an outer diameter direction with a dielectric foam therebetween, and then adhesion is performed under certain curing conditions, to manufacture a foam core composite sandwich spring. In this case, the adhesion may be performed by using methods such as adhesive application, use of an adhesive film, or co-curing.

Figure 6:
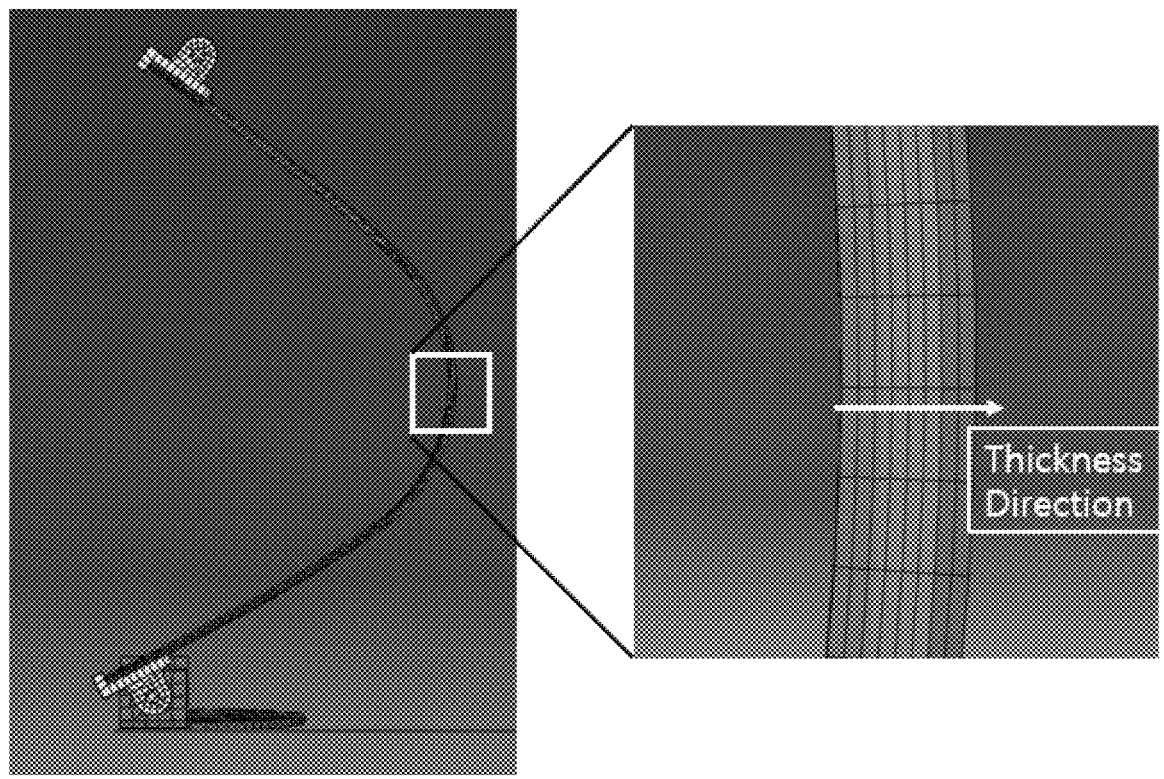
FIG. 6 is a simulation result showing a degree of deformation, in a thickness direction, of a foam core that is a dielectric body according to bending deformation of a composite material.

FIG. 6 is a simulation result showing a degree of deformation, in a thickness direction, of a foam core that is a dielectric body according to bending deformation of a composite material.

Referring to FIG. 6, it is found that, in a sandwich composite spring according to the present disclosure, deformation in a thickness direction is dominant according to bending deformation.

Figure 7:
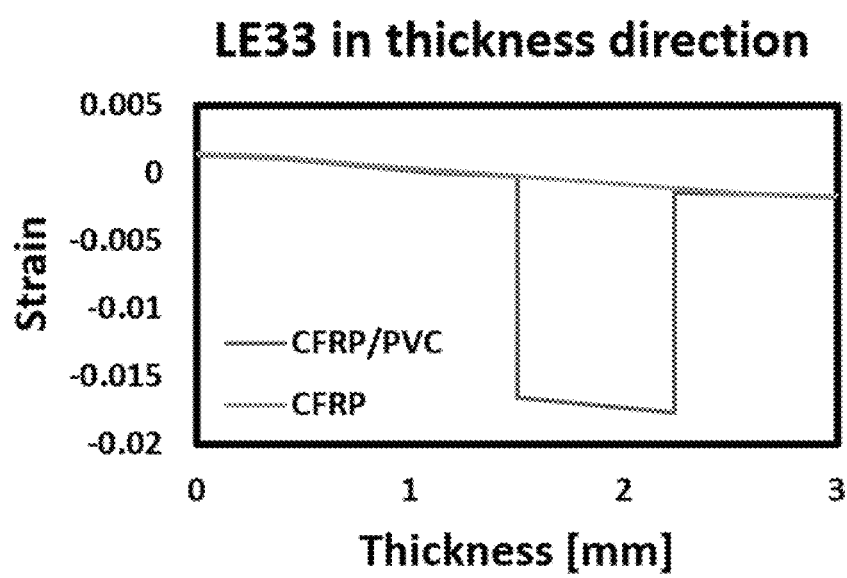
FIG. 7 is a comparative analysis result showing a strain according to a relative position of a core foam.

FIG. 7 is a comparative analysis result showing a strain according to a relative position of a core foam.

Referring to FIG. 7, it is found that, regarding a strain in a thickness direction according to bending deformation, as a dielectric core foam is asymmetrically located closer to an outer diameter side, a tensile strain on an interface between a composite and the core foam which is vulnerable to tensile deformation in the thickness direction decreases. Accordingly, in a composite material according to the present disclosure having a sandwich structure, the safety of the entire structure may be increased.

Furthermore, an exoskeleton robot equipped with a composite spring according to the present disclosure was actually worn, a running test was performed on a treadmill (running machine), a capacitance value of the composite spring was measured, and ground reaction force (GRF) values in vertical/horizontal directions were measured through a force plate embedded in the treadmill.

Figure 8:
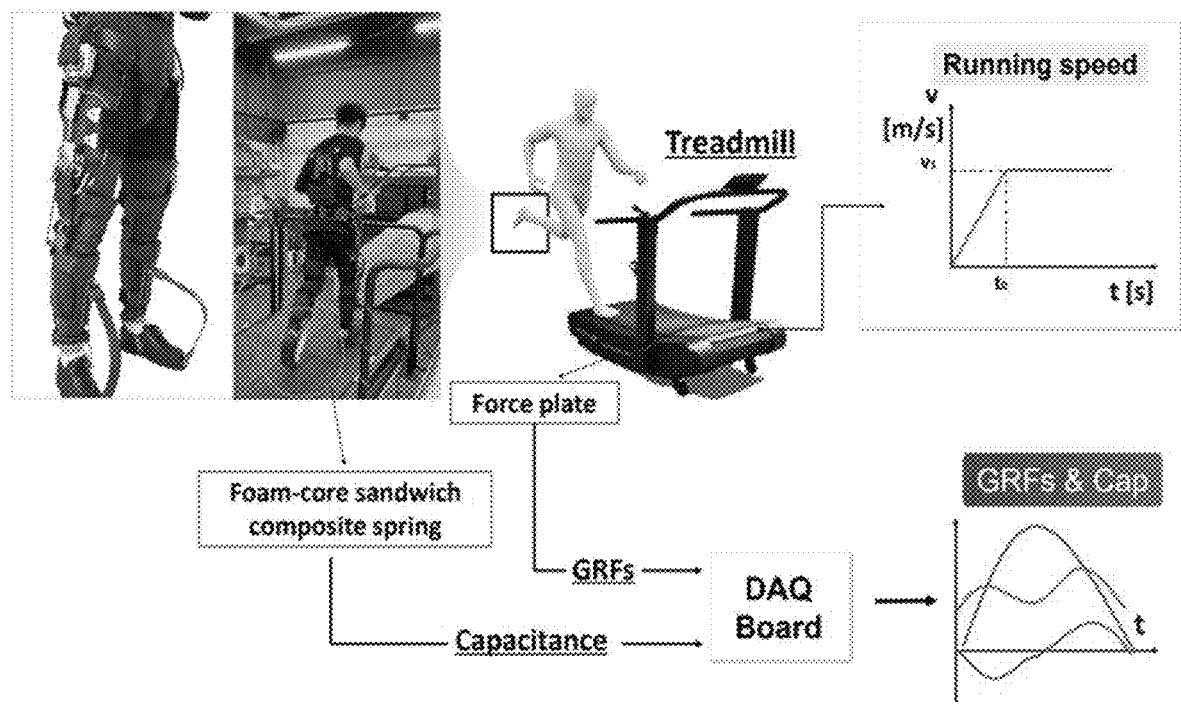
FIG. 8 is a diagram illustrating an experimental method, according to an embodiment of the present disclosure.
Figure 9:
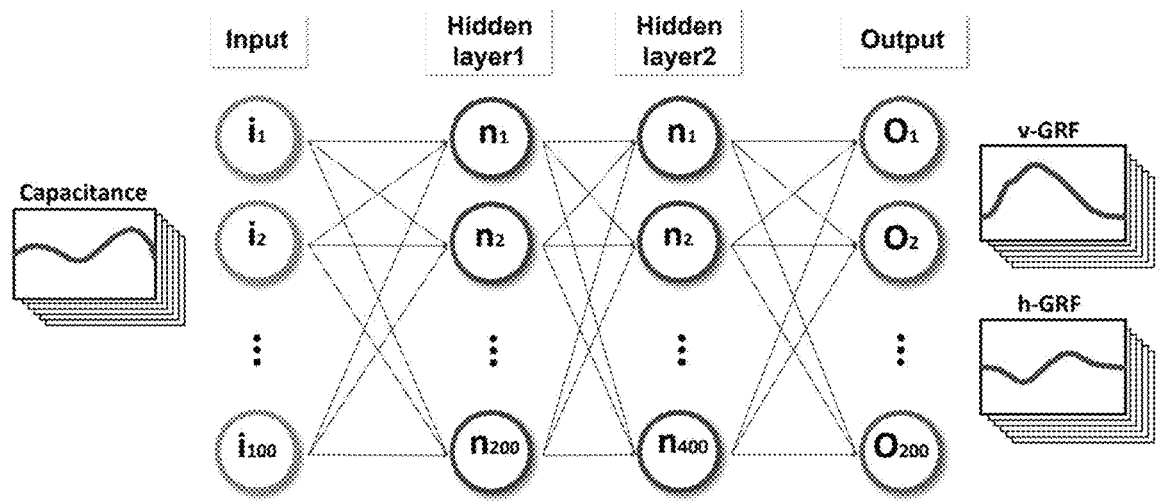
FIG. 9 is a diagram for describing a method of obtaining ground reaction force (GRF) values through actual machine learning.

FIG. 8 is a diagram illustrating an experimental method, according to an embodiment of the present disclosure. FIG. 9 is a diagram for describing a method of obtaining GRF values through actual machine learning.

Referring to FIGS. 8 and 9, GRF values (output) may be derived by using an artificial intelligence model from a capacitance value (input) sensed according to deformation of a composite spring capable of self-sensing according to the present disclosure, and thus it proves that various variables including GRF values may be measured from deformation of a spring itself according to the present disclosure even without a separate sensor.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A composite material capable of measuring bending deformation, the composite material comprising:
   a planar homogenous first conductive composite body that is bendable;
   a planar dielectric body that is bendable and compressible; and
   a planar homogenous second conductive composite body that is bendable,
   the composite material having a length dimension that is substantially larger than a thickness dimension, wherein the thickness of the composite material is comprised of the planar first conductive composite body, the planar dielectric body, and the planar second conductive composite body,
   wherein the first conductive composite body and the second conductive composite body are respectively stacked on and connected to both surfaces of the dielectric body,
   wherein when the composite material is bent with respect to the length dimension, the bending causes a compression of the planar dielectric body, which results in a change in capacitance between the first conductive composite body and the second conductive composite body,
   wherein the change in capacitance is substantially greater due to bending along the length dimension compared to a force applied normal to the first or second composite body,
   wherein the change in capacitance can be used to measure the bending deformation of the composite material,
   wherein heights of the first conductive composite body and the second conductive composite body from the dielectric body are different from each other,
   wherein the first conductive composite body is provided in an inner diameter direction and the second conductive composite body is provided in an outer diameter direction, and the second conductive composite body is thinner than the first conductive composite body.

2. The composite material capable of measuring bending deformation of claim 1, wherein the dielectric body is a compressible foam.

3. The composite material capable of measuring bending deformation of claim 2, wherein the dielectric body is a foam comprising at least one selected from the group consisting of polyvinyl chloride (PVC), polyurethane (PU), melamine, polymethacrylimide (PMI), polyethylene terephthalate (PET), and polyvinylidene fluoride (PVDF).

4. The composite material capable of measuring bending deformation of claim 1, wherein the composite material is capable of measuring bending deformation without any sensors, traces, or protrusions between an outer surface of the first conductive composite body and an outer surface of the second conductive composite body.

5. The composite material capable of measuring bending deformation of claim 4, wherein the first and second conductive composite bodies comprise at least one selected from the group consisting of a uni-directional carbon fiber composite, a carbon fabric composite, and a short carbon fiber composite.

6. The composite material capable of measuring bending deformation of claim 1, wherein the first conductive composite body and the second conductive composite body are carbon fiber reinforced plastics.

7. The composite material capable of measuring bending deformation of claim 1, wherein the first conductive composite body and the second conductive composite body are in bent shapes.

8. The composite material capable of measuring bending deformation of claim 1, wherein the dielectric body has a lower density than the first conductive composite body and the second conductive composite body.

9. The composite material capable of measuring bending deformation of claim 1, wherein the dielectric body is a foam comprising at least one selected from the group consisting of polyvinyl chloride (PVC), polyurethane (PU), melamine, polymethacrylimide (PMI), polyethylene terephthalate (PET), and polyvinylidene fluoride (PVDF).

10. The composite material capable of measuring bending deformation of claim 1, wherein the first and second conductive composite bodies comprise at least one selected from the group consisting of a uni-directional carbon fiber composite, a carbon fabric composite, and a short carbon fiber composite.

11. A spring capable of measuring bending deformation of itself, the spring comprising:
   a planar first conductive composite body that is bendable;
   a planar dielectric body that is bendable and compressible; and
   a planar second conductive composite body that is bendable,
   wherein the first conductive composite body and the second conductive composite body are respectively stacked on both surfaces of the dielectric body,
   wherein heights of the first conductive composite body and the second conductive composite body from the dielectric body are different from each other,
   wherein deformation of the dielectric body in a thickness direction is greater than deformation in length or other directions according to bending deformation of the composite material, causing a change in capacitance between the first conductive composite body and the second conductive composite body,
   wherein the change in capacitance can be used to measure the bending deformation of the spring,
   wherein the spring is capable of measuring bending deformation without any sensors, traces, or protrusions between an outer surface of the first conductive composite body and an outer surface of the second conductive composite body,
   wherein the first conductive composite body is provided in an inner diameter direction and the second conductive composite body is provided in an outer diameter direction, and the second conductive composite body is thinner than the first conductive composite body.

12. The spring of claim 11, wherein the composite material of the spring is configured to store elastic energy produced when the spring is compressed in the dielectric body and then release the elastic energy upon recovery.

13. The spring of claim 11, wherein an amount of compression of the spring can be measured based on the deformation of the dielectric body in the thickness direction.

14. The spring of claim 11, wherein an amount of compression of the spring can be measured based on a change in capacitance between the first conductive composite body and the second conductive composite body.

* * * * *